Aug. 20, 1957  J. F. STEPHENS  2,803,043
METHOD FOR MOLDING FIBER REINFORCED PLASTIC ARTICLES
Filed April 23, 1953
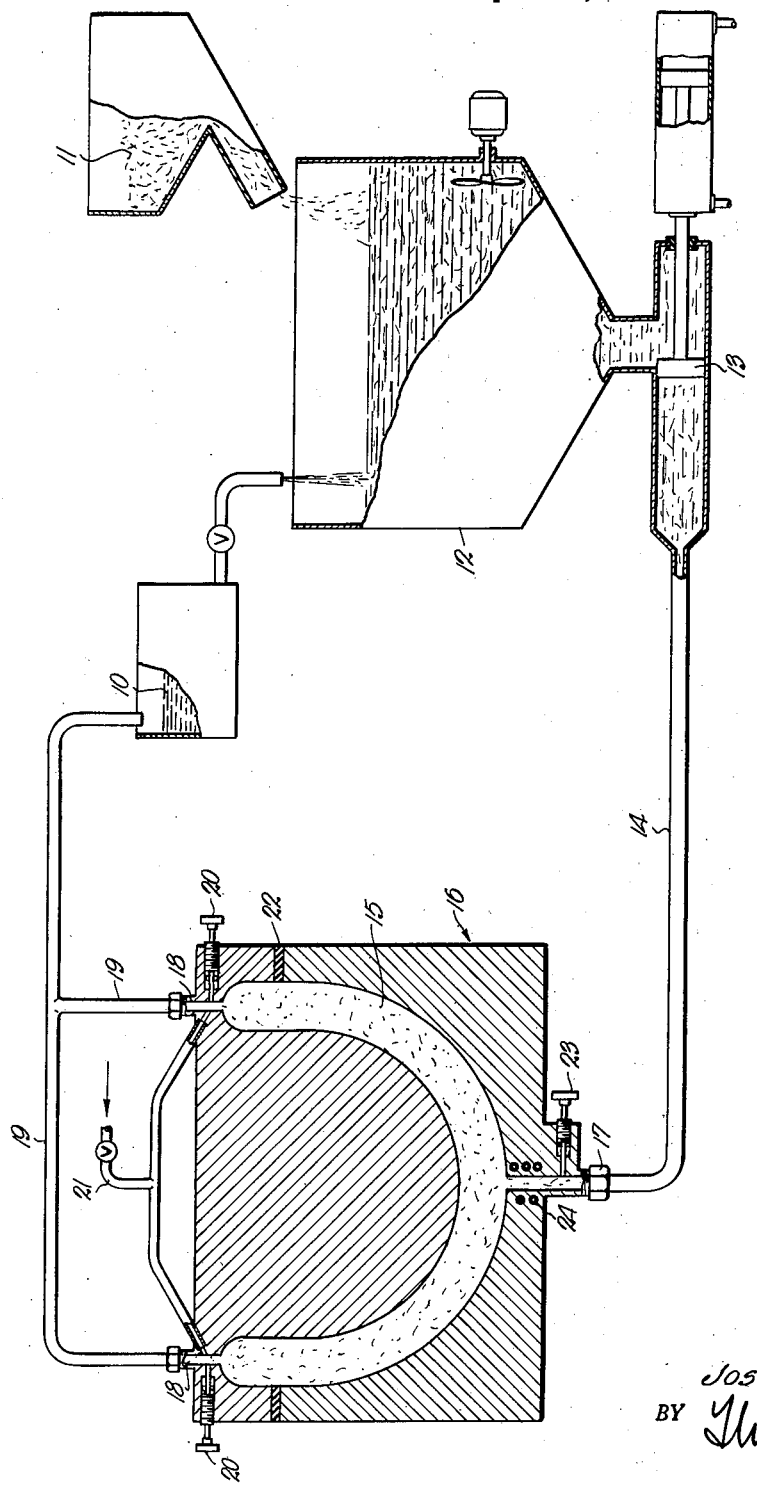
INVENTOR.
Joseph F. Stephens
BY
ATTORNEY.

United States Patent Office

2,803,043
Patented Aug. 20, 1957

2,803,043

METHOD FOR MOLDING FIBER REINFORCED PLASTIC ARTICLES

Joseph F. Stephens, Kansas City, Mo., assignor to Gustin-Bacon Manufacturing Company, a corporation of Missouri Application April 23, 1953, Serial No. 350,775

5 Claims. (Cl. 18—58)

This invention relates to an improved method for molding fiber reinforced plastic articles and more particularly to a method for injection molding of plastic articles reinforced by mineral fibers.

Molded plastic articles have been heretofore made by the process commonly known as injection molding whereby the thermoplastic resin, clear or reinforced, is introduced under high pressure through gates into the closed cavity within the mold.

Similarly, articles made of both thermoplastic and thermosetting resins have been made by a process commonly described as compression molding wherein the plastic resin, clear or reinforced, in bulk, in size pieces, or preformed, has been placed within the mold cavities and subjected to heat and pressure. As commonly used, such molding is at pressures sufficiently high to require either air or hydraulic pressuring means to effect mold closure and to retain pressure on the articles while they are in the state of being molded.

Also, notably in the laminating field, reinforced plastics with many forms of reinforcements, including fibrous material, have utilized heated molds or heated platens with air or hydraulic pressure, or the articles have been formed onto one-half of a mold, with the other face of the laminate bearing against a pressurizing means such as an air-bag.

Long mineral fibers have been found most suitable for reinforcement of high strength or structural plastics. In injection molding it has been found that such fibers can be suspended within the molding resin, and in such state of suspension be moved with the resin under pressure through appropriate conduits. However, it is with great difficulty that these long mineral fibers can be moved into recesses and small pockets of intricate moldings, which are notoriously weak if not properly reinforced.

Therefore, it is an object of the present invention to provide an improved method of injection molding fiber reinforced plastic articles in which the reinforcing fibers can be easily moved into recesses and pockets of intricate moldings.

A further object is to provide a method for injection molding fiber reinforced plastic articles wherein any desired concentration of reinforcing fibers may be achieved in the various parts of the mold and molded article.

A further object is to provide a method for injection molding fiber reinforced plastic articles wherein a portion of the molding resin is bled off from the mold and recirculated to the source of resin and reinforcing fibers.

A further object is to provide a method for injection molding fiber reinforced plastic articles in which the means for pressurizing the material within the mold cavity during the process of cure is the fluid pressure exerted by the resin, making unnecessary heavy and cumbersome hydraulic presses as a means for such pressure.

Other and further objects and features will appear in the course of the following description of the invention.

The method herein described comprises the steps of flowing mineral fibers suspended in a fluid resin into the cavity of a mold and bleeding off resin from the mold at predetermined points to effect concentration of fibers in selected portions of the mold cavity and the molded object.

In the accompanying drawing, the single figure is a schematic representation showing the method of the invention.

Appropriate amounts of resin 10 and fiber 11 are combined within a vessel 12 and the mixture is introduced into a pressurized system. The vessel within which the fibers and resin are first combined may be a pressure vessel, and if desired, a part of the pressurized system. Pressure from a suitable source, such as a hydraulically actuated piston 13, a compressed air line or any form of conventional pump, is made effective on the stream of resin with fibers in suspension within a conduit 14.

The conduit containing the resin and fibers under pressure connects with the cavity 15 of a suitable mold 16 with a pressure tight connection 17. This connection is normally located in a portion of the mold most distant from the extremity of the cavity or from pockets of intricate shape that are part of the mold cavity.

A high strength material is preferably used for the mold although other materials, such as Kirksite or plaster can in some cases be used. The mold may be ported for steam as a means for heating or it may be heated by some other external means. The mold has one or more bleeder points 18 communicating with the top portions of the mold cavity and with cavity pockets or deadends of the cavity. These bleeder points are in the form of ports or risers and are either made so small as to prevent any appreciable amount of the fibers from passing out through the ports or risers with the resin, or, if made larger, perforated plugs with small openings are screwed into them to accomplish the same purpose.

The resin is allowed to pass into and through the mold cavity and out through the bleeder points. The fibers carried into the mold cavity with the resin are in greater part trapped therein and continue to accumulate, first in the vicinity of the bleeder points, since the ports are so sized as to permit passage of the resin while at the same time stopping or straining out the fibers.

As the fibers accumulate in the form of a pack the resistance to the flow of the resin is increased causing pressure to be exerted on the fiber pack thereby moving the fibers into small pockets or other intricate portions of the mold cavity. When the cavity has been completely filled with fibers to the desired density or pack, the part is ready for molding. Such fibers are by then well wetted with resin.

If desired, an additional step of recirculating resin bled from the mold back into the resin-fiber supply may be added to the method. This is done to reduce the loss of resin to a minimum. Tubing 19 or some other form of conduit may be connected to the bleeder points so surplus resin may be returned to a closed circulation back to source.

It is also contemplated where the resin is recirculated from the bleeder points back into the resin supply, to plug the input opening and bleeder points, such as by gate valves 20, during the curing step when the desired concentration of fibers in the mold is achieved and inject into the recirculating resin a stream of gas fed through line 21 from any suitable source (not shown). This gas is usually injected adjacent the discharge points of the resin from the mold and is introduced into the bleeder conduits for the purpose of returning the resin to a position in the closed circulation sufficiently distant from the mold surface to prevent such resin from setting up or curing.

If it is desired to pressurize the mold during the curing process, two methods of accomplishing this are contemplated. In the first, the male portion of the mold may have been slightly spaced from the female portion by use of a gasket 22 sufficient to contain the fluid pressure of the resin within the mold during the filling of the mold. The input opening and bleeder points are plugged, the input having a similar gate valve 23, and the molded object subjected to a curing step when the desired concentration of fibers in the mold is achieved. The gasket is removed prior to inserting the mold into a press or other pressurizing and heating means and full closure of the mold is effected during the cure or set of the resin while the piece is being molded.

In the alternate method, after the desired concentration of fibers in the mold is achieved, only the bleeder points of the mold are plugged, and the molded object is subjected to a curing step. The pressure of the resin is thus maintained on the material in the cavity in the process of cure. No other pressurizing means need be employed. The material in the cavity may be heated by heat passing through the walls of the mold into the cavity. The resin pressure may be maintained, raised or lowered through the input conduit as required by the cure. The portion of the input conduit adjacent the mold may be chilled as by cooling coil 24 to keep the resin within that portion from setting up or the resin may be allowed to set up and the slight gate removed from that portion of the conduit after the cure is complete; this gate being removed from the finished molded piece by methods well known to the art. At the same time the riser or bleeder portions are broken or otherwise severed from the molded article.

A method has thus been provided for obtaining a dense pack of resin saturated fibrous material within a mold cavity and particularly in small or intricate pockets that are a part thereof. A method has also been provided for pressurizing the material within the mold cavity during the process of cure through the fluid pressure exerted by the resin, making unnecessary heavy and cumbersome hydraulic presses as a means for such pressure.

A method has also been provided for keeping the resin within a closed circulation and curing only that portion of the resin which is within the mold cavity and in the intake and outlet ports of the mold, thus recovering all surplus resin and keeping it within a closed circulation away from the air so as to avoid its setting up.

From the foregoing it will be seen that this invention is one well adapted to attain all of the ends and objects hereinabove set forth together with other advantages which are obvious and which are inherent to the method.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. A method for molding fiber reinforced plastic articles comprising the steps of flowing fibers suspended in a fluid resin into the cavity of a mold, and bleeding resin from the mold at predetermined points to effect concentration of fibers in selected portions of the mold cavity and the molded object.

2. A method as in claim 1 in which the input opening and bleeder points of the mold are plugged and the molded object subjected to a curing step after the desired concentration of fibers in the mold is achieved.

3. A method as in claim 1 in which only the bleeder points are plugged and the molded object subjected to a curing step after the desired concentration of fibers in the mold is achieved.

4. A method for molding fiber reinforced plastic articles comprising the steps of flowing fibers suspended in a fluid resin into the cavity of a mold, bleeding off resin from the mold at predetermined points to effect concentration of fibers in selected portions of the mold cavity and the molded object and recirculating resin bled from the mold back into the resin-fiber supply.

5. A method for molding fiber reinforced plastic articles comprising the steps of flowing fibers suspended in a fluid resin into the cavity of a mold, bleeding off resin from the mold at predetermined points to effect concentration of fibers in selected portions of the mold cavity and the molded object, recirculating resin bled from the mold back into the resin-fiber supply, plugging the input opening and bleeder points of the mold, then removing that portion of the resin bled from the mold which remains adjacent the mold from the vicinity of the mold, and curing the molded object while in the mold.

References Cited in the file of this patent

UNITED STATES PATENTS

| | | |
|---|---|---|
| 2,495,640 | Muskat | Jan. 24, 1950 |
| 2,644,195 | Bennes et al. | July 7, 1953 |